(12) United States Patent
Luckhardt et al.

(10) Patent No.: US 11,909,943 B2
(45) Date of Patent: Feb. 20, 2024

(54) FOOD PREPARATION ENTITY

(71) Applicant: ELECTROLUX APPLIANCES AKTIEBOLAG, Stockholm (SE)

(72) Inventors: Christoph Luckhardt, Rothenburg ob der Tauber (DE); Thorben Schiffler, Rothenburg ob der Tauber (DE); Kersten Kaiser, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/413,190

(22) PCT Filed: Nov. 29, 2019

(86) PCT No.: PCT/EP2019/083067
§ 371 (c)(1),
(2) Date: Jun. 11, 2021

(87) PCT Pub. No.: WO2020/120172
PCT Pub. Date: Jun. 18, 2020

(65) Prior Publication Data
US 2022/0021865 A1 Jan. 20, 2022

(30) Foreign Application Priority Data
Dec. 12, 2018 (EP) .................................... 18212055

(51) Int. Cl.
*H04N 13/239* (2018.01)
*G06T 7/55* (2017.01)
(Continued)

(52) U.S. Cl.
CPC .......... *H04N 13/239* (2018.05); *F24C 7/085* (2013.01); *F24C 15/006* (2013.01); *G06T 7/55* (2017.01);
(Continued)

(58) Field of Classification Search
CPC ......... H04N 13/239; H04N 2005/2255; H04N 5/22521; H04N 5/2257
See application file for complete search history.

(56) References Cited

U.S. PATENT DOCUMENTS

| 11,116,050 B1* | 9/2021 | Bhogal | ............... H04N 5/2252 |
| 2005/0244050 A1* | 11/2005 | Nomura | ............... H04N 13/398 |
| | | | 348/E13.072 |

(Continued)

FOREIGN PATENT DOCUMENTS

| CN | 206757709 | * 12/2017 |
| CN | 207354502 | * 5/2018 |

(Continued)

OTHER PUBLICATIONS

International Search Report and Written Opinion for PCT/EP2019/083067, dated Mar. 4, 2020, 13 pages.
(Continued)

*Primary Examiner* — Kathleen V Nguyen
(74) *Attorney, Agent, or Firm* — Pearne & Gordon LLP

(57) ABSTRACT

The invention relates to a food preparation entity comprising a cavity (2) for receiving food (3) to be prepared and at least two cameras (4, 5) for capturing images of the food (3) included in the cavity (2), wherein said cameras (4, 5) are positioned such that images are captured from different points of view, wherein each camera (4, 5) comprises a certain field of view (4.1, 5.1), wherein immediately adjacent fields of view (4.1, 5.1) of said cameras (4, 5) at least partially overlap and wherein a processing entity (6) is provided which is configured to calculate three-dimensional information of the food (3) included in the cavity (2) based on the images provided by the cameras (4, 5).

19 Claims, 3 Drawing Sheets

(51) Int. Cl.
*F24C 7/08* (2006.01)
*F24C 15/00* (2006.01)
*H04N 23/52* (2023.01)
*H04N 23/57* (2023.01)
*H04N 23/50* (2023.01)

(52) U.S. Cl.
CPC ............ *H04N 23/52* (2023.01); *H04N 23/57* (2023.01); *F28F 2250/08* (2013.01); *H04N 23/555* (2023.01); *H04N 2213/001* (2013.01)

(56) References Cited

U.S. PATENT DOCUMENTS

| | | | |
|---|---|---|---|
| 2012/0062707 A1* | 3/2012 | Seo | H04N 13/239 |
| | | | 348/47 |
| 2013/0149651 A1 | 6/2013 | Thielvoldt et al. | |
| 2014/0048055 A1* | 2/2014 | Ruther | A21B 3/02 |
| | | | 126/190 |
| 2014/0078052 A1 | 3/2014 | Kadantseva et al. | |
| 2014/0203012 A1 | 7/2014 | Corona et al. | |
| 2015/0305543 A1 | 10/2015 | Matarazzi | |
| 2017/0261213 A1* | 9/2017 | Park | H04N 5/2257 |
| 2018/0292093 A1* | 10/2018 | Bhogal | F24C 7/086 |

FOREIGN PATENT DOCUMENTS

| | | | | |
|---|---|---|---|---|
| JP | 2015137812 | | 7/2015 | |
| JP | 2018169133 | | 11/2018 | |
| KR | 101635162 | | 6/2016 | |
| WO | WO-2015142331 A1 * | | 9/2015 | ........... A61B 3/1208 |
| WO | WO-2016128372 A1 * | | 8/2016 | ........... E05B 1/0084 |

OTHER PUBLICATIONS

Intention to Grant for application No. 18212055.0 dated Nov. 29, 2022, 23, pages.

* cited by examiner

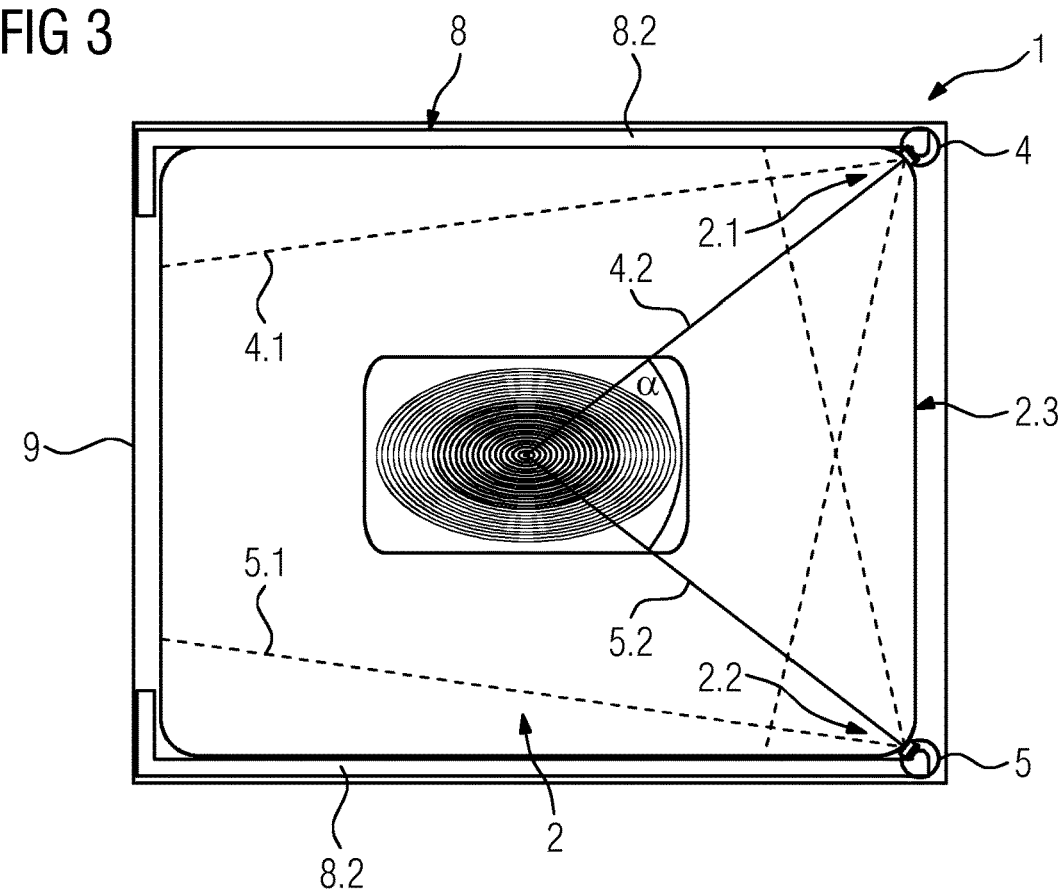
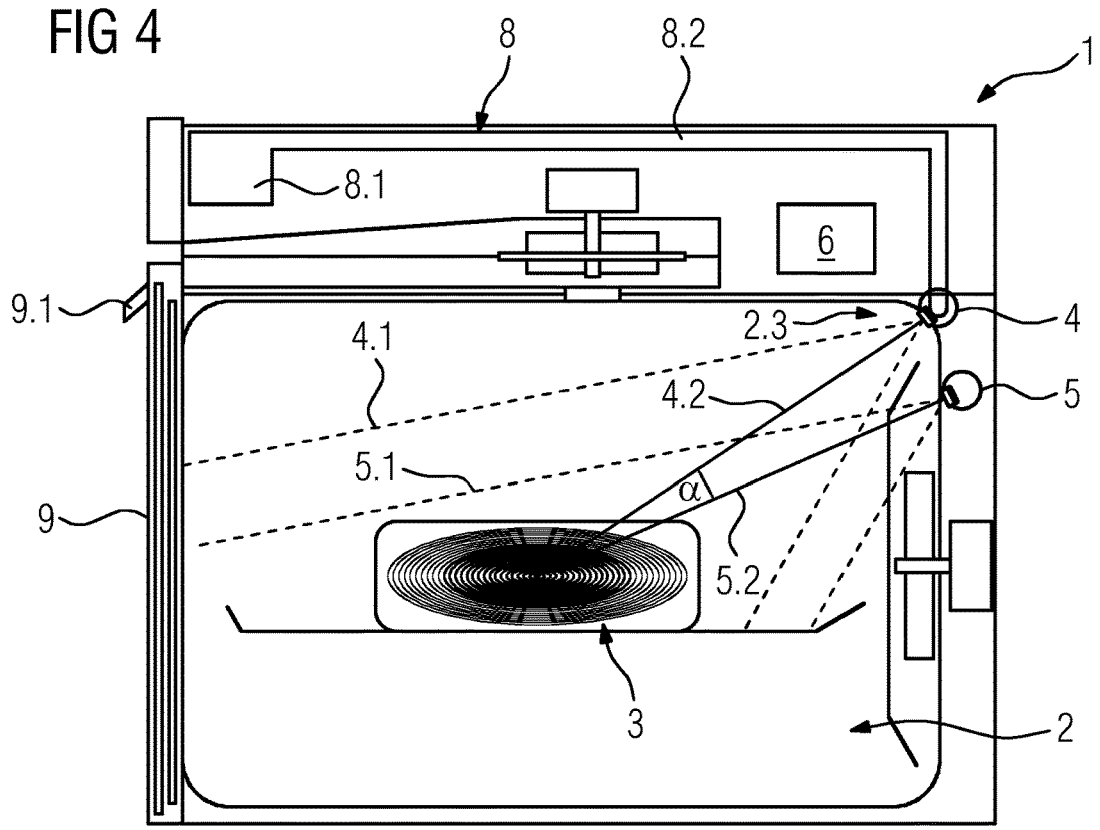

FOOD PREPARATION ENTITY

The present invention relates generally to the field of food preparation entities. More specifically, the present invention is related to a food preparation entity adapted to determine the three-dimensional shape of food received within a cavity of the food preparation entity.

BACKGROUND OF THE INVENTION

Food preparation entities, for example baking ovens, are well known in prior art. Such food preparation entities comprise a cavity for receiving food to be cooked or baked and a door for closing the cavity during the food preparation process. The food preparation entity may comprise an image recognition system for capturing optical information of said food received within the cavity.

SUMMARY OF THE INVENTION

It is an objective of embodiments of the present invention to provide a food preparation entity which is adapted to establish reliable three-dimensional information of the food to be cooked based on optical information with limited technical effort. If not explicitly indicated otherwise, embodiments of the invention can be freely combined with each other According to a first aspect, the invention relates to a food preparation entity comprising a cavity for receiving food to be prepared and at least two cameras for capturing images of the food included in the cavity. Said cameras are positioned such that images are captured from different points of view. Each camera comprises a certain field of view, wherein immediately adjacent fields of view of said cameras at least partially overlap. A processing entity is provided which is configured to calculate three-dimensional (3D) information of the food included in the cavity based on the images provided by the cameras.

Said food preparation entity is advantageous because based on said cameras with partially overlapping fields of view, reliable 3D-information can be gathered with reduced technical effort.

According to embodiments, each camera comprises a main view axis and the angle between the main view axes of cameras providing immediately adjacent fields of view is in the range between 1° and 89°, preferably between 5° and 30°, more preferably between 10° and 15°, most preferably 11°, 12°, 13° or 14°. Using said alignment rules, the fields of view of the cameras are positioned with respect to each other such that precise 3D-information with improved texture extraction can be obtained.

According to embodiments, at least one camera is coupled with cooling means for cooling the camera. Said cameras may be included in the cavity. More in detail, the cameras may be attacked to the cavity wall or included in a recess of said cavity wall. Thereby it is possible to use cameras with lower temperature requirements for recording the interior of the cavity.

The cameras may share common cooling means or each camera may comprise its own cooling means.

According to embodiments, the cooling means use air or a cooling liquid as heat transfer medium. Thereby a regional cooling effect at the respective camera can be obtained.

According to embodiments, the cooling means may comprise an air duct, a heat pipe or a liquid-based cooling system. Based on said cooling entities, an improved cooling of the camera can be achieved.

According to embodiments, the cooling means comprise a heat sink provided by a surface portion of the food preparation entity or provided by a heat exchanger. Thermal energy may be transported by air, a heat pipe or a cooling liquid from the camera to the heat sink in order to provide a cooling effect at the camera.

According to embodiments, the cooling means comprise a heat exchanger operatively coupled with a cooling arrangement of the food preparation entity. Said cooling arrangement may be used not only for cooling the cameras but may be also used for cooling other entities of the food preparation entity, for example electronics, the oven door glass etc. The cooling arrangement may, for example, comprise a fan for generating an air flow through to the heat exchanger.

According to embodiments, the cooling means comprise a liquid-based cooling system including a pump, a heat exchanger and a tubing for providing a liquid circulation between at least one camera and the heat exchanger. Using such liquid-based cooling system, a high cooling effect at the camera can be obtained. The tubing, respectively, the liquid-based cooling system may include one or more cameras in order to provide a cooling effect at a single camera or multiple cameras.

According to embodiments, the at least two cameras are included in the cavity. The cameras may be arranged to capture images from a top view, specifically from a slanted top view. Thereby an improved integration into the food preparation entity can be obtained.

According to embodiments, at least one camera is included in the cavity and at least one further camera is included in a door handle of a door of the food preparation entity. Thereby it is possible to obtain images from different points of view.

According to embodiments, the at least two cameras are included in the door handle of a door of the food preparation entity. Thereby, cooling means for cooling the cameras can be avoided because the heat impact on the cameras included in the door handle is quite low.

According to embodiments, at least one camera provides a field of view from the interior of the cavity through a door glass of a door of the food preparation entity and a processing entity is configured to provide gesture control based on the information provided by said camera. Thereby, the camera providing images for generating 3D-information of the food to be prepared can be further used for gathering information for gesture control.

According to a further aspect, the invention relates to a method for gathering three-dimensional information of food received within a cavity of a food preparation entity based on at least two cameras. The method comprises the steps of:
  capturing images by the at least two cameras from different points of view, wherein each camera comprises a certain field of view, wherein immediately adjacent fields of view of said cameras at least partially overlap;
  calculating three-dimensional information of the food included in the cavity based on the images provided by the cameras.

According to embodiments, the cameras are cooled by cooling means. Thereby the heat impact on the cameras can be reduced and cameras configured for low temperature applications can be used for capturing the images.

According to embodiments, the images are captured by cameras comprising main view axes and the angle between the main view axes of cameras providing immediately adjacent fields of view is in the range between 1° and 89°, preferably between 5° and 30°, more preferably between 10° and 15°, most preferably 11°, 12°, 13° or 14°.

The term "food preparation entity" as used in the present disclosure may refer to any appliance which can be used for preparing food, specifically ovens, steam ovens, microwave ovens or similar frying, baking or cooking appliances.

The term "essentially" or "approximately" as used in the present disclosure means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which:

FIG. 3 shows a first embodiment of a food preparation entity with a first camera arrangement in a top sectional view;

FIG. 4 shows a second embodiment of a food preparation entity with a second camera arrangement in a lateral sectional view.

DETAILED DESCRIPTION OF PREFERRED EMBODIMENTS

Figure 1:
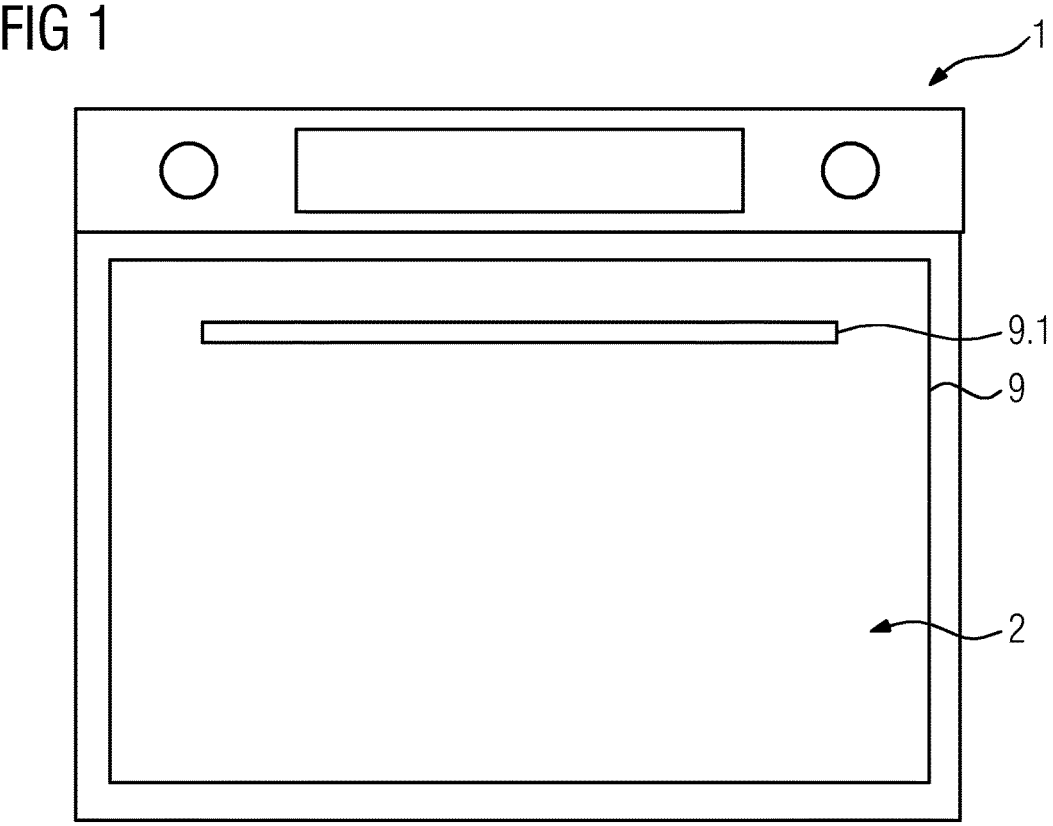
FIG. 1 shows an example schematic view of a food preparation entity.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic illustration of a food preparation entity 1. In the present example, the food preparation entity 1 is a baking oven. However, the food preparation entity 1 should not be considered limited to such baking oven. The food preparation entity 1 may also be a microwave appliance, a steam oven etc. The food preparation entity 1 comprises a base body in which a cavity 2 for receiving food 3 to be prepared is provided. The food preparation entity 1 may comprise a door 9 with a door handle 9.1 for closing the cavity 2 during the food preparation process.

In addition, the food preparation entity 1 comprises an image capturing system. The image capturing system comprises at least two cameras 4, 5, specifically digital cameras adapted to capture optical information of the food 3 received within the cavity 2. Said optical information may be digital images. Based on said digital images, a processing entity 6 of the food preparation entity 1 establishes three-dimensional (3D) information of said food 3 received within the cavity 2. In the following embodiments, a pair of cameras 4, 5 is included in the cavity 2. However, according to other embodiments, the food preparation entity 1 may comprise more than two cameras.

Preferably, the cameras 4, 5 may be included in an upper region of the cavity 2 of the food preparation entity 1. More in detail, the cameras 4, 5 may be placed above the food 3 in order to be able to capture images from an upper side, specifically according to a slanted top-down view.

The cameras 4, 5 may comprise the same or different functions, technologies and optical characteristics. For example, the cameras 4, 5 may be of monochrome or color type, a infrared or plenoptic camera, may have the same or different aperture, focal length or resolution. In addition, the cameras 4, 5 may have multiple or automatic focal points or may have a matrix optic.

Figure 2:
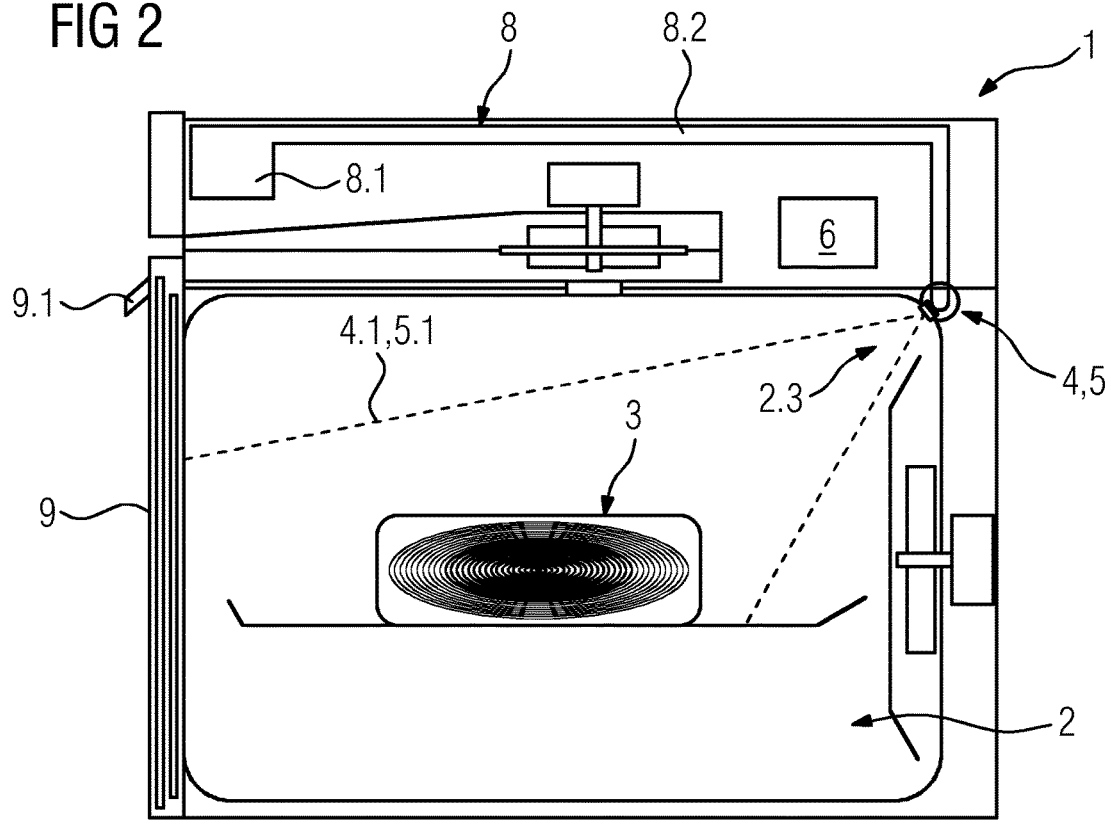
FIG. 2 shows a first embodiment of a food preparation entity with a first camera arrangement in a lateral sectional view.

FIGS. 2 and 3 show a first embodiment of the food preparation entity from different points of view. The cameras 4, 5 are included in the cavity 2. More in detail, the cameras 4, 5 are spatially distributed along a horizontal axis in an upper edge 2.3. For example, the cameras 4, 5 are arranged in opposite upper corners 2.1, 2.2 of the cavity 2 which are located opposite to the door 9. However, the arrangement of the cameras 4, 5 in opposite upper corners 2.1, 2.2 averted from the door 9 is only a mere example. The cameras 4, 5 can be arranged closer together at the horizontal edge 2.3 of the cavity 2, i.e. not in the corner regions but at a certain distance to said corners 2.1, 2.2.

As shown in FIGS. 2 and 3, the cameras 4, 5 provide a certain field of view 4.1, 5.1 (as indicated by the dashed lines). Said field of view 4.1, 5.1 is mainly influenced by the detection angle of the camera. Said field of view 4.1, 5.1 may be, depending on the technology of the camera, fixed or variable. For example, a variable field of view may be obtained by a linear movement of the camera. For example, a variable field of view may be obtained by a linear movement of the camera.

The fields of view 4.1, 5.1 of different cameras 4, 5 may at least partially overlap in order to improve the calculation of 3D-information of the food 3. Said overlapping may be achieved by a suitable arrangement of cameras 4, 5 in the cavity 2 and/or an angular alignment of cameras 4, 5 with respect to a central area of the cavity 2, in which the food 3 to be prepared is typically received.

Each camera 4, 5 may comprise a main view axis 4.2, 5.2. The main view axis of a camera may be an axis arranged in the centre of its field of view and/or may be an axis which extends between a central portion of the cavity 2 and the respective camera 4, 5.

In order to further improve the calculation of 3D-information of the food 3, the main view axes 4.2, 5.2 of the cameras may include an angle α in the range of 1° and 89°. Preferably, the angle α may be in the range of 5° to 30°, more preferably in the range of 10° to 15°, specifically 11°, 12°, 13° or 14°. Using said angles α, the food 3 is recorded from slightly different perspectives which leads to better texture extraction possibilities and an improved basis for calculating 3D-information.

Figure 5:
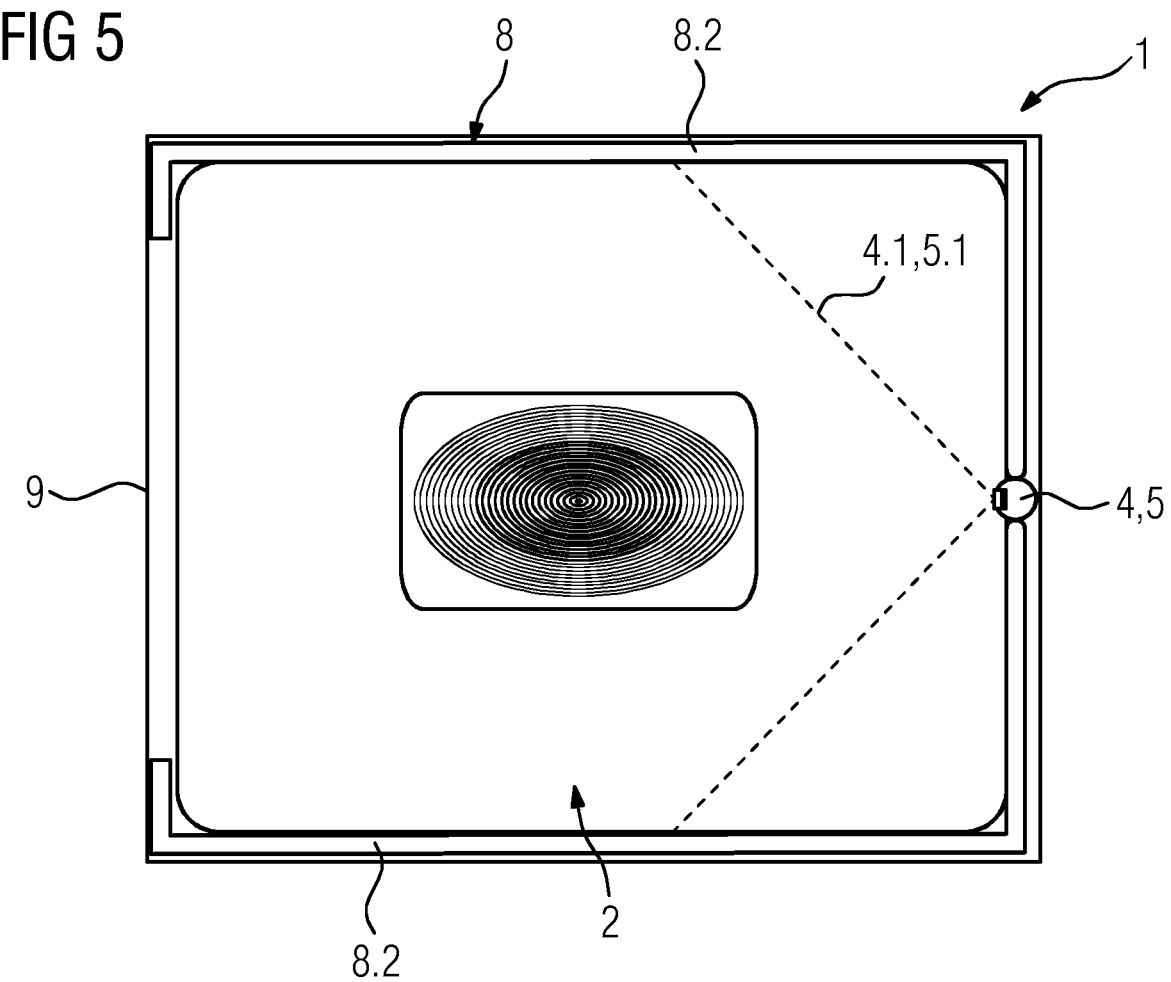
FIG. 5 shows a second embodiment of a food preparation entity with a second camera arrangement in a top sectional view.

FIGS. 4 and 5 show a further example embodiment of a food preparation appliance 1 with a different configuration of the image capturing system. The cameras 4, 5 are not spaced in a horizontal direction but are spatially distributed along a vertical or essentially vertical axis.

As shown in FIGS. 4 and 5, a first camera 4 may be arranged in the centre or essentially in the centre of the upper rear edge 2.3 of the cavity 2. Said upper rear edge 2.3 may be arranged at a distance and opposite to the door 9. The second camera 5 may be arranged below the first camera 5. The distance between the first and the second camera 4, 5 may be in the range of 2 cm to 40 cm, specifically in the range of 5 cm to 15 cm. Thereby, the cameras 4, 5 are able to provide images from slightly different points of view, both in a slanted top-down direction.

The cameras 4, 5 according to the embodiments of FIG. 2 to 5 may be attached to the inner wall of the cavity 2 or may be at least partially included in a recess provided in said cavity wall (partial or full camera integration).

According to yet another configuration of the image capturing system (not shown in the figures), at least one camera may be included in the door 9. The camera may be included in the main body of the door 9, for example in the door frame. According to another embodiment, the camera may be included or attached to the door handle 9.1 and aligned such that the camera is able to capture images through a window provided in the door 9.

Typically, in food preparation entities 1 high temperature values occur. In order to avoid damage of the cameras 4, 5 and/or degraded image capturing conditions (especially of CCD sensors), the cameras 4, 5 are operatively coupled with cooling means 8. The cooling means 8 are configured to ensure a cooling of the camera 4, 5 such that images with a suitable image quality can be captured without greater impact of the temperature provided within the cavity.

The cooling means 8 may use different kinds of cooling media, for example air, water or another cooling liquid. The cooling means 8 cooling the cameras 4, 5 may operatively coupled with a cooling arrangement of the food preparation entity 1 which provides a cooling of another entity of the food preparation entity (e.g. a fan provides an air stream to a processing unit as well to the camera or a heat exchanger coupled with the camera). According to another embodiment, the cameras 4, 5 may comprise separate cooling means 8 which only provide cooling of the cameras 4, 5 (and not for other operational entities of the food preparation entity 1). The two or more cameras 4, 5 may comprise a common cooling system, i.e. may share at least some components of a common cooling system or each camera 4, 5 may comprise its own cooling system (i.e. a separated cooling system for each camera 4, 5).

According to an embodiment, the cooling means 8 may comprise, as shown in FIGS. 2 to 5 a liquid-based cooling system. More in detail, the cooling means 8 may comprise a tubing 8.2 and a heat exchanger 8.1, wherein said tubing 8.2 couples one or more cameras 4, 5 with said heat exchanger 8.1. A cooling liquid, for example water, may circulate through the cooling system. Thereby heat from one or more cameras 4, 5 is transferred to the cooling liquid and transported to the heat exchanger 8.1 in order to provide a cooling effect at the camera(s) 4, 5. The heat exchanger 8.1 may be built by a surface portion of the food preparation entity 1, e.g. a cooler surface area of a housing portion or the heat exchanger 8.1 may be a separate entity specifically adapted for heat exchange (e.g. an entity comprising cooling ribs). A pump may be used for providing the circulation of the cooling liquid.

According to another embodiment, the cameras 4, 5 may be cooled by an air stream. For example, a blower may be directly attached to the respective camera 4, 5 or an air duct may be used for providing an air stream generated by a fan to the cameras 4, 5. The fan may be a fan configured to merely cool down one or more of said cameras 4, 5. However, an air stream provided by a fan used for cooling other entities (e.g. electronics, door glass etc.) of the food preparation entity 1 can be also used for cooling the cameras 4, 5.

According to yet another embodiment, a heat pipe may be used for cooling the cameras 4, 5. Said heat pipe may be coupled with the camera 4, 5 at a first end and may transport the heat due to its high heat conductivity to a heat exchanger or a surface portion of the food preparation entity 1 (e.g. a housing portion arranged in a lower temperature region than the cameras 4, 5).

In case that at least one of said cameras 4, 5 has a field of view such that a region in front of the door glass can be captured by the camera 4, 5 (i.e. camera 4, 5 can capture images through the door glass), the captured images can be used for providing a gesture control. For example, the captured images may be analyzed by the processing entity 6 in order to recognize certain gestures of a user in front of the food preparation entity 1 in order to control the food preparation entity 1 based on the recognized gestures.

It should be noted that the description and drawings merely illustrate the principles of the proposed method and food preparation entity. Those skilled in the art will be able to implement various arrangements that, although not explicitly described or shown herein, embody the principles of the invention.

LIST OF REFERENCE NUMERALS

1 Food preparation entity
2 cavity
2.1 corner
2.2 corner
2.3 edge
3 food
4 camera
4.1 first field of view
4.2 main view axis
5 second camera
5.1 field of view
5.2 main view axis
6 processing entity
8 cooling means
8.1 heat exchanger
8.2 tubing
9 door
9.1 door handle
α angle

The invention claimed is:

1. Food preparation entity comprising a cavity for receiving food to be prepared and at least two cameras for capturing images of the food included in the cavity, wherein said cameras are positioned such that images are captured from different points of view, wherein each camera comprises a certain field of view, wherein immediately adjacent fields of view of said cameras at least partially overlap and wherein a processing entity is provided which is configured to calculate three-dimensional information of the food included in the cavity based on the images provided by the cameras, wherein each camera comprises a respective main view axis, wherein an angle (α) between the main view axes of said cameras providing the immediately adjacent fields of view is in a range between 10° and 15°.

2. Food preparation entity according to claim 1, wherein at least one said camera is coupled with cooling means for cooling the at least one said camera.

3. Food preparation entity according to claim 2, wherein the cooling means use air or a cooling liquid as heat transfer medium.

4. Food preparation entity according to claim 2, wherein the cooling means comprise an air duct, a heat pipe or a liquid-based cooling system.

5. Food preparation entity according to claim 2, wherein the cooling means comprise a heat sink provided by a surface portion of the food preparation entity or provided by a heat exchanger.

6. Food preparation entity according to claim 2, wherein the cooling means comprise a heat exchanger operatively coupled with a cooling arrangement of the food preparation entity.

7. Food preparation entity according to claim 2, wherein the cooling means comprise a liquid-based cooling system including a pump, a heat exchanger and a tubing for providing a liquid flow circulation between at least one said camera and the heat exchanger.

8. Food preparation entity according to claim 1, wherein the at least two cameras are included in the cavity.

9. Food preparation entity according to claim 1, wherein at least one said camera is included in the cavity and at least one further said camera is included in a door handle of a door of the food preparation entity.

10. Food preparation entity according to claim 1, wherein the at least two cameras are included in a door handle of a door of the food preparation entity.

11. Food preparation entity according to claim 1, wherein at least one said camera provides a field of view from an interior of the cavity through a door glass of a door of the food preparation entity, and a processing entity is configured to provide gesture control based on the information provided by the at least one said camera.

12. Food preparation entity according to claim 1, wherein at least one of said cameras provides a field of view from an interior of the cavity through a door glass of a door of the food preparation entity.

13. Method for gathering three-dimensional information of food received within a cavity of a food preparation entity based on at least two cameras, the method comprising the steps of:
   capturing images by the at least two cameras from different points of view, wherein each camera comprises a certain field of view, wherein immediately adjacent fields of view of said cameras at least partially overlap, the at least two cameras comprising respective main view axes, wherein an angle ($\alpha$) between the main view axes of said cameras providing the immediately adjacent fields of view is in a range between 10° and 15°;
   calculating three-dimensional information of the food included in the cavity based on the images provided by the cameras.

14. Method according to claim 13, wherein the cameras are cooled by cooling means.

15. Method according to claim 13, wherein at least one of said cameras provides a field of view from an interior of the cavity through a door glass of a door of the food preparation entity.

16. Food preparation entity comprising: a cavity for receiving food, an image capturing system adapted to ascertain three-dimensional information concerning food received within the oven cavity, and a camera cooling system;
   said image capturing system comprising a first camera and a second camera, said first camera having a first field of view aligned along a first main view axis and embracing a location within said cavity for receiving food, said second camera having a second field of view aligned along a second main view axis and embracing said location within said cavity, said first and second cameras being oriented such that said first field of view overlaps said second field of view at said location within the cavity, wherein an angle ($\alpha$) between the first main view axis and the second main view axis is in a range between 10° and 15°, said first camera being located within said cavity;
   said camera cooling system being adapted to cool said first camera via either: a heat-transfer fluid comprising at least one of air or a cooling liquid that circulates between the first camera and a heat sink located remote from the first camera, or a conductive heat pipe connected between and in thermal communication with said first camera and said heat sink.

17. Food preparation entity according to claim 16, said second camera being located within said cavity, said camera cooling system adapted to also cool said second camera via either: said heat-transfer fluid circulating between both said first and second cameras and said heat sink, or said conductive heat pipe being connected and in thermal communication with both said first and second cameras and said heat sink, said heat sink comprising a heat exchanger integrated with or as a cooler surface of a housing of the food preparation entity.

18. Food preparation entity according to claim 16, said heat-transfer fluid comprising air, the camera cooling system further comprising a fan adapted to circulate air between said first camera and said heat sink, as well as to an independent processing unit of said food preparation entity in order to also cool the independent processing unit.

19. Food preparation entity according to claim 16, wherein at least one of said first and second cameras provides a field of view from an interior of the cavity through a door glass of a door of the food preparation entity.

* * * * *